Sept. 14, 1965

W. D. BOUDOT ETAL 3,206,071

METERING AND CUTOFF DEVICES

Filed July 11, 1963

INVENTORS
WILLIAM DONALD BOUDOT AND
DONALD E. COYLE,
BY Youngblut, Melville, Strasser & Foster
ATTORNEYS.

INVENTORS
WILLIAM DONALD BOUDOT AND
BY DONALD E. COYLE,

ATTORNEYS.

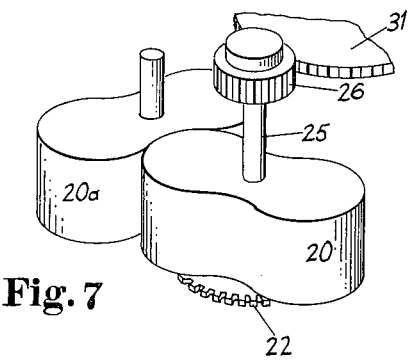
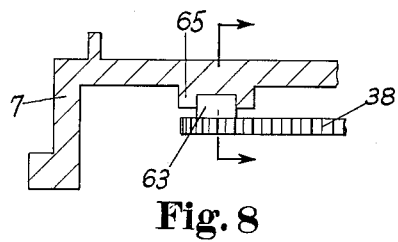
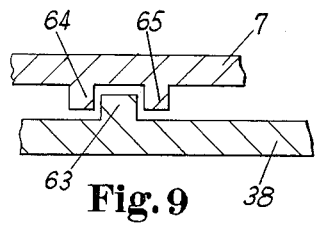
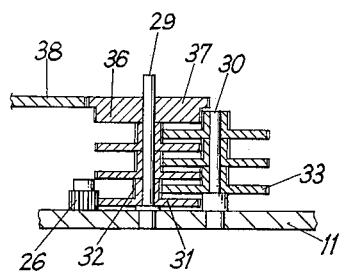
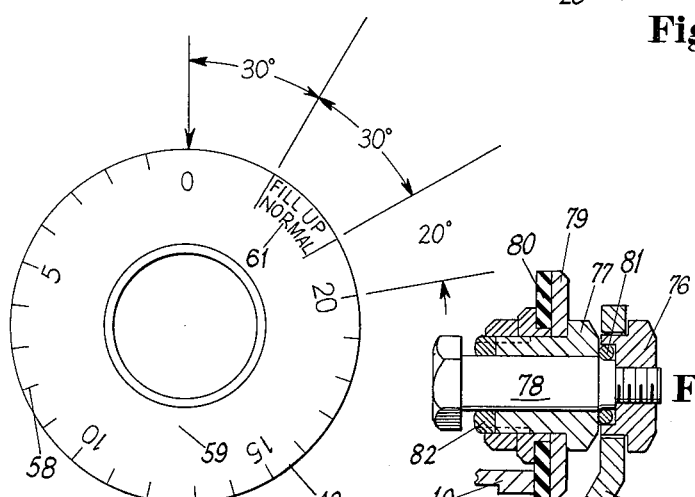
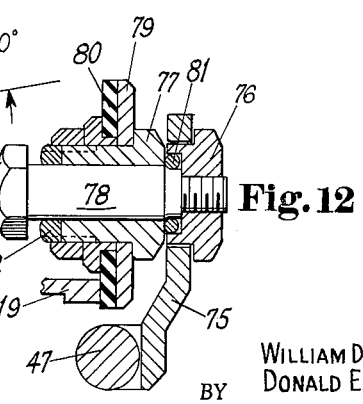
Sept. 14, 1965   W. D. BOUDOT ETAL   3,206,071
METERING AND CUTOFF DEVICES
Filed July 11, 1963   3 Sheets-Sheet 3
Fig. 7
Fig. 8
Fig. 9
Fig. 10
Fig. 11
Fig. 12
INVENTORS
WILLIAM DONALD BOUDOT AND
DONALD E. COYLE,
BY
ATTORNEYS.

United States Patent Office 3,206,071
Patented Sept. 14, 1965

3,206,071
METERING AND CUTOFF DEVICES
William Donald Boudot and Donald E. Coyle, Hamilton County, Ohio, assignors to Dover Corporation, Cincinnati, Ohio, a corporation of Delaware
Filed July 11, 1963, Ser. No. 294,296
12 Claims. (Cl. 222—20)

The invention relates to metering devices for fluids, the devices themselves being of small size and light weight, but so arranged as to be settable for the dispensing of a given quantity or monetary amount of fluid while acting to shut off the flow of fluid at the conclusion of the dispensing operation for which the device has been set. The devices of this invention are useful wherever the functions just enumerated are of importance.

The invention will hereinafter be described in a particular environment which involves the dispensing of liquid fuel such as gasoline in filling stations, it being understood that this use is exemplary only and does not constitute a limitation upon the invention.

In the vending of automotive fuels, use is ordinarily made of a standard or pedestal which contains indicating means, and may contain a pump for withdrawing the fuel from a storage tank. In any event, a flexible delivery hose will be attached to the standard at one end and will carry at its opposite end a valve means for initiating and cutting off the flow of the fluid fuel, together with a terminal nozzle by means of which the fuel can be introduced into the tank of an automotive vehicle. Also in this field, automatic valves have been developed which function to shut off the flow of the fuel when the tank of the vehicle becomes full. While there are various forms of these automatic valving means, they generally comprise a main valve, a handle for operating the main valve, means for holding the handle in valve-open position, and a sensing means operating to trip the valve or release the handle when the level of the fuel being dispensed reaches an end portion of the spout of the device. A more detailed description of an automatic valve mechanism is not required for purposes of this case; but reference may be made to United States Letters Patent No. 2,582,195 dated January 8, 1952 as showing one form of such an automatic valve or nozzle.

Not all purchasers who come to a filling station will require their fuel tanks to be filled up. On the contrary, some purchasers for various reasons will demand a lesser quantity of fuel than would be required to fill the tank, or will demand such a quantity of fuel as will cost a stated sum at prevailing prices. The advantage of an automatic nozzle is that once it has been placed in position with reference to the tank of an automotive vehicle and the fuel flow started, the attendant may go about the performance of other tasks knowing that the flow of the fuel will be shut off when the tank is full. But if a lesser quantity of fuel is demanded, it has hitherto been necessary for the attendant to remain at the dispensing nozzle and watch the indicators on the pedestal so as to be able to shut off the flow of fuel when the demanded quantity or monetary amount has been dispensed.

As a consequence, a need has been felt for a metering device which can be preset for a demanded quantity of fuel, whether the quantity be measured in volumetric units or in total cost.

The metering device of this invention has utility as, and it is an object of the invention to provide, a metering device which will be usable both with automatic and with non-automatic dispensing nozzles. In either type of use, the attendant will be free to perform other tasks during the length of time required to effect the dispensing of that quantity of fluid for which the metering device is set.

It is an object of the invention to provide a settable metering device suitable for use in any situation where the dispensing of a given quantity of fuel is desired, followed by the shutting off of the fluid flow when the preset quantity has been dispensed.

It is an object of the invention to provide a self-contained metering and shut-off device of such small size and light weight that it can be attached to and used with dispensing nozzles which must be carried and manipulated by hand.

It is an object of the invention to provide a metering and shut-off device which is not only accurate but is unaffected in its operations by the particular position it occupies during a dispensing operation.

In the dispensing of liquid fuels by measured quantities, it is advisable to cause the metering device to shut off the fluid flow just before the demanded quantity has been dispensed, so that the attendant may thereafter bring the quantity up to the demanded value by hand operation of a valve or a valve operating handle on a dispensing nozzle. This involves certain problems, and in particular a problem of manipulating the metering and shut off device so that the dispensing valve can be used to introduce into the tank additional small increments of the fuel. It is an object of the invention to provide a metering and cutoff device which may be so manipulated.

It is an object of the invention to provide means in connection with the metering and cutoff device which can be used to render it inoperative where the customer demands that his fuel tank be filled up and where reliance can be had upon the sensing means in an automatic nozzle.

Once the metering and cutoff device of this invention has operated to stop the flow, it is likely that the valve in the metering nozzle will remain in the open position. To render the metering and cutoff device of this invention inoperative at this point would start an uncontrolled further flow of the fluid. Consequently, it is an object of this invention to provide means in connection with the metering and cutoff device to inhibit the setting of it to inoperative position prior to the time when the main valve of the dispensing nozzle is closed by the attendant.

These and other objects of the invention, which will be set forth hereinafter or will be apparent to one skilled in the art upon reading these specifications, are accomplished by that structure and arrangement of parts of which an exemplary embodiment will now be described. Reference is made to the accompanying drawings wherein:

FIG. 7 is a perspective view of a lobe arrangement.

FIGS. 8 and 9 are sectional views showing an interengagement of a detent on the main driven gear with detents on the cover member.

FIG. 10 is a sectional view of a speed reducing gearing which may be employed in the device.

FIG. 11 is a plan view of one form of dial member which may be employed.

FIG. 12 is a sectional view of a double-poppeted valve.

Figure 2:
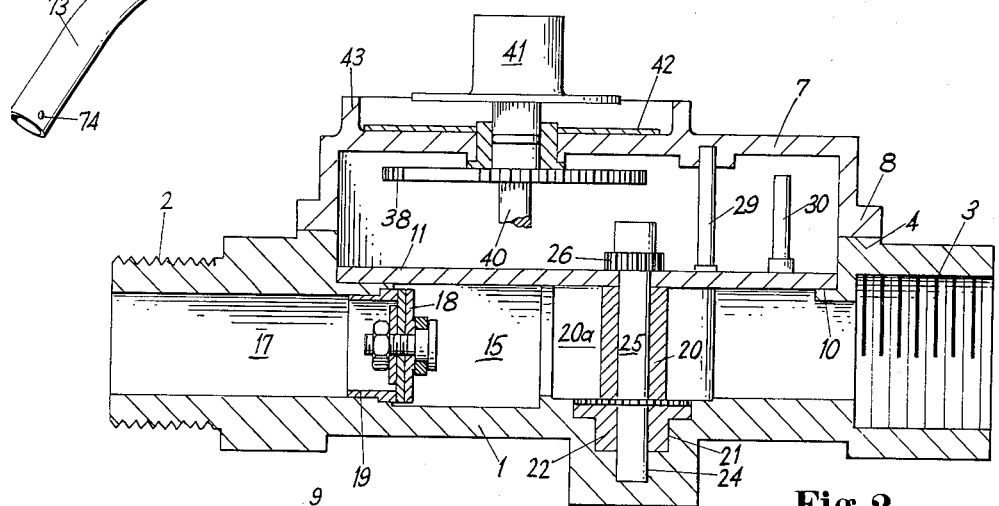
FIG. 2 is a vertical sectional view of the metering and cutoff device with certain parts eliminated for the sake of clarity.
Figure 3:
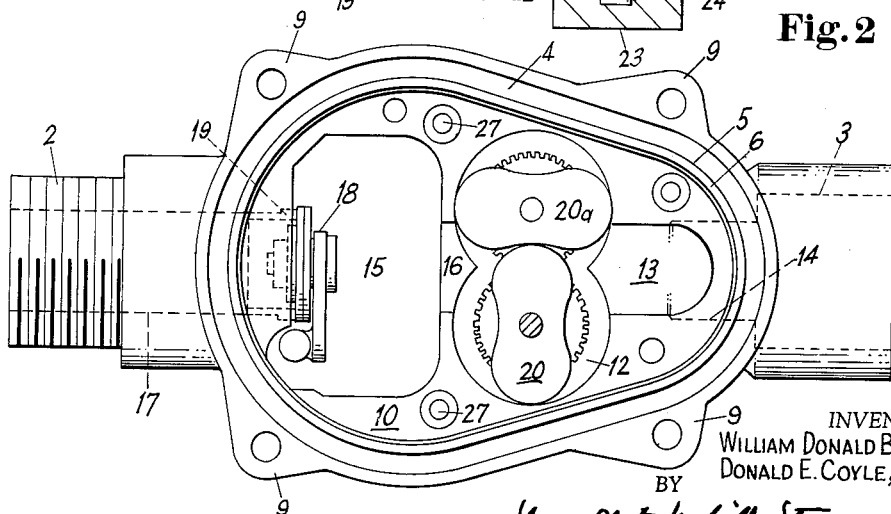
FIG. 3 is a plan view of the body of the device with the cover and the interior mechanism removed.

In the exemplary form of the metering and cutoff device of this invention, a hollow casting is provided to form a body. The casting may be made of any desired rigid substance, but is preferably made of aluminum alloys for the sake of saving weight. The casting has a hollow body 1 with a tubular extension at each end. One of these extensions is externally threaded as at 2 (see FIGS. 2 and 3) while the other is internally threaded as at 3. In this particular embodiment, the threaded portion 2 may be engaged in the threaded end of the handle of a dispensing nozzle, as will be clear from FIG. 1, while a coupling on the end of the conventional flexible conduit which connects the nozzle with the dispensing pedestal may be threaded into the portion 3 of the body. The open top of the hollow body is provided with a uniplanar ledge 4 which is grooved as at 5 to accept an O-ring 6 so that a cover member 7 having a downwardly depending flange 8 corresponding to the ledge 4 may be used to close the housing in a liquid tight fashion. In FIG. 3 the body is shown as having ears 9 extending outwardly beyond the ledge 4. Although not illustrated in FIG. 2, the cover member 7 will be understood to have similar ears similarly positioned. This enables the cover member to be fastened in place on the body by means of bolts or other suitable elements 9a (shown only in FIG. 1).

The body is configured to provide a ledge 10 located somewhat below the ledge 4 and serving to support a plate 11 hereinafter more fully described. The lower part of the body is configured to provide a space 12 containing a means which will be driven by the passage of fluid through the body. The space 12 is connected by a space 13 and a bore 14 to the internally threaded member 3. The ledge 10 has a depression 15 which is connected to the space 12 by a passageway 16 and also is connected to the externally threaded element 2 by a bore 17. The space 15 is of such size and shape as will accommodate a swinging check valve indicated generally in FIG. 3 at 18. It will be seen from FIG. 2 that the inner end of the bore 17 may be provided with an insert 19 providing a seat for the check valve 18. The space 15 in the body will be so shaped as to permit the valve 18 to swing away from its seat; and when the valve is open, it will be clear that fluid may flow through the body from the internally threaded fitting 3 to the externally threaded fitting 2 passing, however, the driven means located in the space 12.

There is provided in connection with the metering and shut off device of this invention a means which will be driven by the flow of fluid through the device. Various means may be employed including a nutating disc arrangement, a rotary piston device or a plain impeller (all of which are well known); but inasmuch as the metering device of this invention is designed to measure the flow of fluid accurately, a type of hydraulic motor comprising two lobes is preferred. The preferred lobes are illustrated in perspective at 20 and 20a in FIG. 7 and in plan in FIG. 3. Each lobe is mounted upon a shaft having a bearing both in the bottom of the body and in the platform 11. Since it has been found advisable to gear the lobes together so as to insure equal and opposite rotation, the bottom portion of the body 1 is provided with stepped depressions 21 which contain gears 22 mounted on the shafts of the lobes and meshing with each other. The bottom part of the housing or body 1 may be carried downwardly as at 23 to provide room for these gears as well as bearings, e.g. 24 for the lobe shafts. In FIG. 2 the shaft 25 of the lobe 20 is shown as extending upwardly through the platform 11 and bearing a gear element 26. The platform element 11 will be fastened to the ledge 10 by bolts engaging in threaded openings 27 (FIG. 3) the actual bolts being shown at 28 in FIG. 4.

The hydraulic motor, comprising the two lobes hereinbefore described, which rotates at a speed directly proportional to the flow of fluid through the housing or body, will be employed to drive a cam means hereinafter described which, through a suitable cam follower, will cause the valve 18 to close when the desired fill has been attained. In order to accomplish this, there will have to be provision for great speed reduction between the shaft 25 and the cam. This speed reduction can be accomplished in various ways as by worms and worm wheels; but a compact means capable of great speed reductions and well known in the art consists of two stacks of gears and pinions. The platform 11 (see FIG. 2) carries two stub shafts 29 and 30. The gear 26 on the lobe shaft 25 is shown as meshing with a gear 31 on the first stub shaft. A pinion 32 forming part of the gear meshes with a first gear 33 on the second stub shaft. The gear 33 has a pinion 34 which meshes with a second gear on the stub shaft 29, and so on through the two stacks of gears and pinions as will be abundantly clear from FIG. 10. As many of the integral gear-and-pinion structures as may be required to obtain a satisfactory speed reduction may be employed on the stub shafts. A pinion 35 on the topmost gear on stub shaft 30 meshes with the teeth of a final gear 36 on the stub shaft 29. This gear has another gear 37 affixed to it, which in turn meshes with a gear 38 on the shaft of an operating knob including a pointer as hereinafter described. It may be noted from FIG. 2 that the stub shaft 29 has engagement in a bore on the under side of the cover member 7. This is advisable for rigidity. A similar engagement could be provided for the stub shaft 30 (depending upon the diameter of the gear 37) but is not regarded as necessary.

The top member 7 of the housing or body is provided with a bearing 39 for a shaft 40 which is both slidable and rotatable in the bearing. The shaft bears at its top a knob element 41 which carries a pointer traversing a circular scale element 42 above the housing top and preferably surrounded and protected by a raised annular ridge 43. The gear 38 is fixedly mounted on the shaft 40; and it will be evident from the foregoing description that as the lobes rotate with the flow of fluid, the shaft 40 will be caused to rotate also but at a very much slower rate. Sealing of the shaft 40 to the housing top so as to prevent fluid leakage can be accomplished in any way desired, but is most simply done by means of an O-ring 44.

Figure 4:
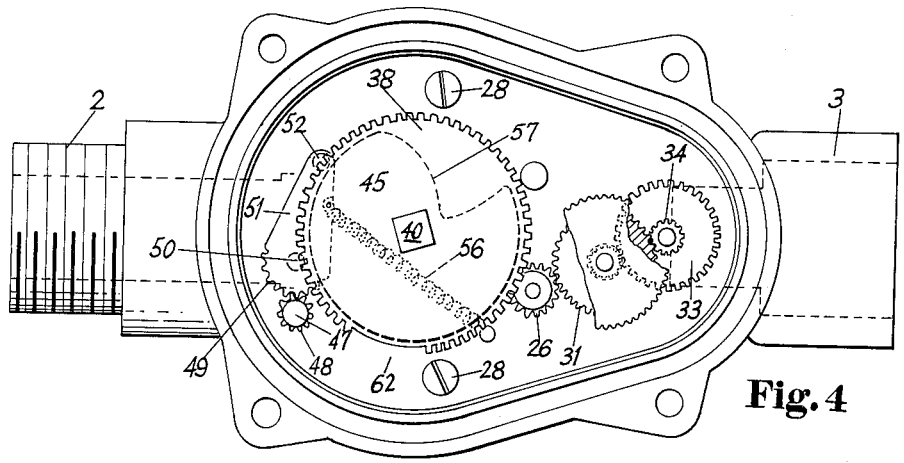
FIG. 4 is a plan view of the body of the device with a platform element in place therein.
Figure 5:
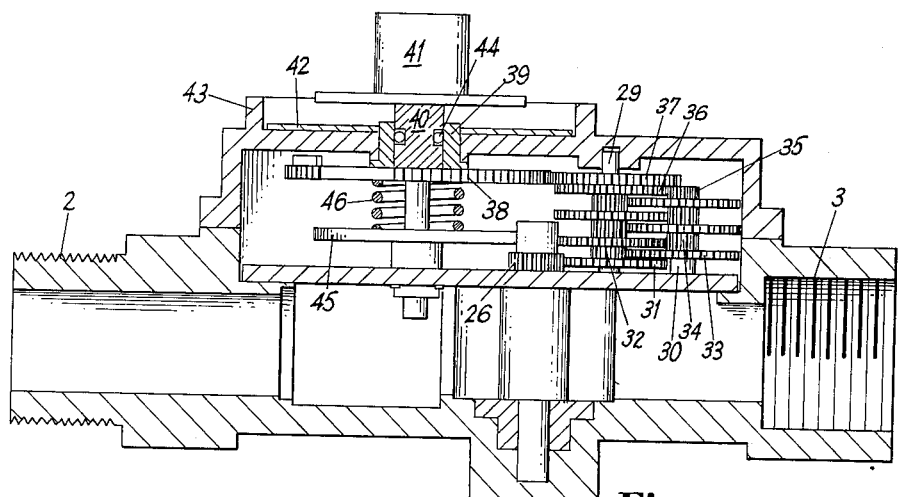
FIG. 5 is a vertical section through the housing including the cover with additional operating parts shown above the platform.

As is best shown in FIGS. 4 and 5, the lower end of the shaft 40 is squared or splined and therefore has a nonrotative but sliding contact with a cam member 45. The cam member is preferably rotatively mounted as shown on the platform 11. Between the gear 38 on the shaft 40 and the cam 45, there is a helical compression spring 46. This tends to keep the gear 38 at the level of the final gear 37 of the speed reducing instrumentality; but it will now be evident that if the knob 41 is pushed downwardly, the gear 38 will be lowered so that its teeth come out of mesh with the teeth of gear 37. Thus, when one wishes to reset the knob with respect to the dial 42, this may be done by pushing downwardly or inwardly on the knob, turning it and then releasing it, whereup the gear 38 will again come to the same level as the gear 37. At the same time, the cam 45 remains non-rotative with respect to the shaft 40 and will be driven if that shaft is being driven by the gear train hereinabove described. Rotating the knob, of course, also rotates the cam.

It is the purpose of the cam to operate the valve 18. This valve is mounted for swinging movement by means of a shaft 47 which has a bearing in the base of the body. The shaft passes through the plate 11 and carries a pinion 48 (see FIG. 4). The pinion meshes with a gear or gear segment 49 rotatably mounted upon a stub shaft 50 on the platform 11. A lever 51 is fixed to the gear 49 at one end so that it must swing when the gear rotates; and the other end of the lever carries a cam follower 52 preferably in the form of a small roller so located as to bear against the periphery of the cam 45.

Figure 6:
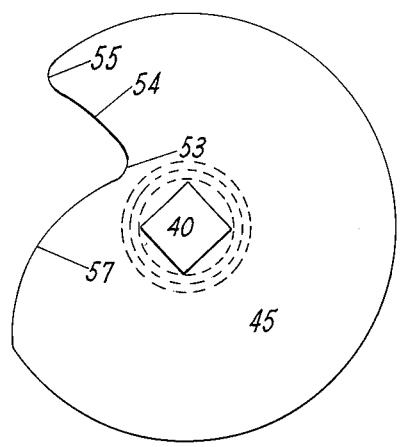
FIG. 6 is a plan view of a cam member.

The cam 45 is shown in plan in FIG. 6. It comprises a circular disc with a notch in one side of it, the notch occupying a circumferential extent of about 80°, although this can be varied. The notch has a bottom portion 53, so positioned that when the cam follower 52 lies therein, the check valve 18 will be closed through the action of the gear 49 and the pinion 48. When the cam follower contacts the circular outer periphery of the cam 45, the valve, of course, will be open. One side of the notch, as shown at 54, has a steep configuration so that when the cam rotates to such a position that the cam follower can pass the nose 55, the closing of the valve will be substantially instantaneous. There is a coil spring or like means 56 (FIG. 4) for biasing the cam follower and its lever toward the center of the cam. The other side of the notch, as indicated at 57, is arcuate but still rather steep in configuration for a purpose to be later outlined.

It will now be understood how the pointer on the knob 41 may be set at any desired value on the scale or dial 42. If fluid is permitted to pass through the metering and cutoff device of this invention, the pointer will traverse the dial in a direction toward zero. When the pointer arrives at zero, the valve instantly closes through the action of the cam and cam follower as above outlined; and the flow of fluid will be cut off.

FIG. 11 is a plan view of a typical dial 42. The dial may carry any desired indicia 58 either in terms of quantity such as gallons or in terms of price or monetary units. It will be evident that if price or cost indicia are used, changes in the price per volume unit of the fuel being dispensed can be taken care of by interchanging dials. Some means must be provided for holding a dial in a properly oriented position within the rim 43. It will be within the skill of the worker in the art to devise various orientation means. FIG. 11 simply indicates that the dial may be held in the oriented position by a set screw 59.

As will be evident from the explanation above, the pointer (60, FIG. 1) on the knob 41 may be set at any desired position with respect to the indicia on the dial by pushing inwardly and downwardly on the knob and rotating it. This disconnects the gear 38 from the gear 37. The cam 45, of course, turns with the gear 38. When the device has been set for a given quantity for a given price, the knob 41 is released, whereupon the spring 46 again raises the gear 38 to the level of the gear 37. When the flow of fuel is started, the lobes 20 and 20a rotate and through the reduction gearing previously described, drive the gear 37 and through it the gear 38 and the cam. The pointer moves over the dial from the presetting toward zero. The relationship between the dial 42 and the cam 45, which is being driven at the same time, is such that when the pointer reaches the zero mark, the cam follower 52 will enter the notch in the cam, and the valve 18 will close, thereby shutting off the flow of the fuel.

As has also been indicated, it is a feature of the invention to provide means for rendering the metering and cutoff device inoperative when not needed, as for example when the customer asks that his tank be filled. It will be noted in FIG. 11 that a portion 61 of the dial is marked "Fill Up Normal"; and when the pointer is set in the position 61, the valve 18 will be open, but the passage of fluid through the metering device will not drive the cam. This is accomplished by omitting the teeth from a limited circumferential portion of the gear 38 as shown at 62 in FIG. 4. The portion 62 is so oriented that when the pointer is set to the "Fill Up Normal" position, there will be no meshing of the gears 37 and 38 even though they lie in the same plane. Thus, the rotation of the lobes and the reducing gear train will not produce rotation of the cam 45, while at the same time the cam follower 52 will lie against a circular portion of the cam, thus keeping the valve 18 open.

The "Fill Up" portion 61 is shown as occupying a limited circumferential area of the dial. When the detent structure later to be described is employed, it would be possible to indicate the "Fill Up" position as a single point on the dial. In order for the valve to be closed, the cam follower 52 must come into the base 53 of the notch in the cam. For purposes later described, the notch itself occupies a substantial angular portion of the cam surface. As a consequence, there will be about an equivalent angular portion of the dial lying between the hoist figure indicia marked thereon and the zero point. This is the angular extent proceeding from the number 20 in FIG. 11 counterclosewise toward the number zero, and has been indicated in that figure as comprising a total of 80°. This is typical but not necessarily limitative. The shape of the cam surface 54, which is slightly concave between points 53 and 55, makes for an instant closing of the valve when the pointer reaches zero. It also prevents a rotation of the knob 41 in the counterclockwise direction once the valve has closed. As already explained, the pointer will be set for a given value of fill by depressing the knob and turning it in the clockwise direction until the pointer lies opposite a number representing either the quantity or the monetary value of the requested fill. During the operation of the device, the pointer will travel farther in a clockwise direction until it reaches the zero point.

It has been found advisable to provide a means for locking the apparatus in the inactive or "Fill Up" position to prevent accidental dislodgment. As shown in FIGS. 8 and 9, one way of doing this is by providing an upwardly extending detent 63 on the gear 38 and a pair of downwardly extending detents 64 and 65 on the cover 7 of the device. The engagement of the detent on the gear between the detents on the cover member occurs when the pointer lies in the position 61. The accidental application of rotative forces to the knob 41 will not change the aforesaid setting. If the setting is to be changed, it is necessary to depress the knob 41 fully against the force of the spring 46.

Figure 1:
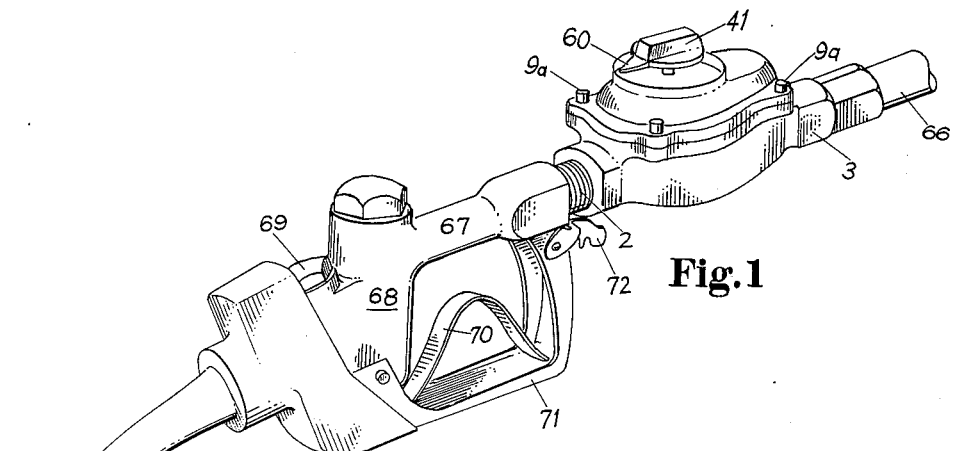
FIG. 1 is an elevational view of a typical combination of an automatic dispensing nozzle and the metering and cutoff device of this invention, as illustrative of the aforesaid exemplary but non-limiting field of utility.

When the metering and cutoff device is being used with an automatic nozzle of the type referred to above, it may assume the position illustrated in FIG. 1. Here the internally threaded member 3 is attached to a coupling member on the end of a supply hose 66 while the externally threaded member 2 is engaged directly with the hollow handle portion 67 of the automatic dispensing valve. The automatic dispensing valve is shown more or less diagrammatically, but it will be understood as containing a main valve in a body portion 68 and a diaphragm means in another body portion 69. There is an operating handle 70 lying within a guard 71 and adapted to open the main valve. It may be held in the open position by a conventional latch or clip 72, engaging one end of the lever. The opposite end of the lever is pivoted to a conventional plunger in the nozzle body, which plunger is adapted to be released by the operation of the diaphragm means in the portion 69. The nozzle has a spout 73. As is also conventional, there will be Venturi means in the automatic nozzle for reducing the air pressure against one side of the diaphragm aforesaid; but the vacuum will normally be relieved by the influx of air through a tube which extends down through the spout and opens outwardly, as at 74, adjacent the spout end. Thus, in the conventional manner, when the operating lever 70 is moved to valve-opening position and latched by the element 72, the fuel will continue to flow through the dispensing nozzle into the tank of an automotive vehicle until the tank is substantially filled. At this juncture, the fuel level will reach the opening 74 in the sensing tube, cutting off the entrance of air. The vacuum against one side of the diaphragm will be increased, as well understood in this art, the plunger will be released, and the position of the operating lever 70 will change sufficiently to permit the main valve to close. The type of automatic dispensing valve shown and described is exemplary merely; but FIG. 1 makes it evident that the metering and cutoff device of this invention may be used in direct connection with a metering and dispensing valve and will not interfere with the normal engagement of a dispensing valve with the pedestal when fuel is not being dispensed.

When the metering and cutoff device is being used to control the dispensing operation, the pointer 60 will be set as hereinabove described for the dispensing of a predetermined quantity of fuel or such a quantity of fuel as will cost a predetermined amount of money. If the valve in the automatic dispensing nozzle is opened by the lever 70, and the lever latched in the open position, the metering and cutoff device will operate as explained, and will cut off the flow of the fuel when the pointer reaches the zero mark on the dial 42, or when the level of fuel in the fuel tank reaches opening 74, whichever occurs first. The use of the metering and cutoff device is not limited to automatic dispensing nozzles, but is applicable to dispensing nozzles which do not have automatic means for interrupting the fuel flow when the tank is filled. In either event, however, the operating handle of the dispensing nozzle will be latched in the open position when the metering and cutoff device is being employed to control the fill; and in either event, when the metering and cutoff device operates to interrupt the flow, the dispensing nozzle valve will remain in the open position.

It is desirable to configure the parts of the metering and cutoff device in such a way as to cause it to cut off the fuel flow at a value slightly short of the value requested by the customer. Thereafter the operating of the filling station may bring the quantity of dispensed fuel accurately up to the requested quantity by operating the valve of the dispenser. In order to do this, however, the valve 18 of the metering and cutoff device must be reopened by setting the pointer 60 to the "Fill Up Normal" position. If this were done while the valve of the dispensing nozzle remained open, there would occur an uncontrolled flow of the fuel which might overshoot the mark. One of the objects of the invention is to make provision against this occurrence by making it very difficult, if not impossible, to set the pointer 60 to the "Fill Up" position so long as the valve of the dispensing nozzle remains open. This will cause the operator to close the valve of the dispensing nozzle in order to be able to set the pointer of the metering and cutoff device to the "Fill Up" position.

Reference is made to FIG. 12 which illustrates in section a preferred form of the valve 18. A double poppeted valve is employed which may take various forms. In the exemplary embodiment, an arm 75 is mounted upon the shaft 47 and carries a head 76. A sleeve 77, having a central bore, is loosely mounted on a bolt member 78 which engages the head. The main poppet consists of a washer-like member 79, preferably faced with a resilient substance 80. The washer member is mounted on the sleeve 77 in any suitable way. It is the member which comes against the valve seat insert 19 previously described (see FIG. 2).

The sleeve member 77 is not only loosely mounted on the bolt 78, but the bolt itself is elongated so that the sleeve is permitted a certain longitudinal movement on the bolt. There is an O-ring 81 surrounding the bolt and adapted to be engaged between the head 76 and the forward face of the sleeve 77, as will be clear from FIG. 12. This construction constitutes a second poppet. Other forms of double-poppeted valves may be used without departing from the spirit of the invention. Assuming the valve to be closed, as indicated in FIG. 12, the first action which will occur upon a turning movement of the shaft 47 and the arm 75 in a clockwise direction will be a separation of the O-ring 81 from tight compressive this occurs, a relatively small quantity of the liquid fuel contact between the head 76 and the sleeve 77. When may flow through the valve in the space between the shaft of the bolt 78 and the internal diameter of the sleeve 77. The sleeve may be notched at its rear end, as indicated at 82, to prevent flow-interrupting contact between the rear end of the sleeve and the bolt head. A further movement of the arm 75 in a clockwise direction will result in a separation of the main poppet 79, 80 from the valve seat member 19.

Now, if the valve 18 is in the closed position and the valve of the dispensing nozzle is open, the pressure of the fuel ahead of the valve 18 will tend to keep it closed. The configuration of the surface 57 on the cam 45 is such that under these circumstances it will be very difficult to rotate the knob 45 to the "Fill Up" position. The knob 41 will be depressed so as to bring the detents 63, 64 and 65 out of contact with each other, but even so, the valve 18 cannot easily be opened against the pressure of the fuel. A rotative force exerted by the arm 75 may open the supplementary poppet of the valve 18 at the O-ring 81; but the relatively small amount of fuel which can flow between the sleeve 77 and the bolt 78 will not interfere with a subsequent fill adjustment, nor will it build up enough pressure on the opposite side of the valve 18 to permit the opening of the main poppet.

The situation is different, however, when the valve of the dispensing nozzle is closed. Although there may initially be a difference in pressure on the two sides of the valve 18 of the metering and cutoff device, the bleeding of a small amount of fuel past the supplementary poppet will almost immediately equalize the pressure ahead of and behind the valve 18, permitting the valve to be swung open easily despite the high angularity of the cam surface 57. As indicated, the metering and cutoff device is preferably so adjusted that cut off takes place slightly ahead of the attainment of the requested fill. There is thus no danger of overfilling, and the station operator can go about other duties during the filling operation since he need not be present when cutoff occurs. Returning from his other duties to find that cutoff has occurred, the operator will first shut off the valve of the dispensing nozzle and then set the pointer of the metering and cutoff device t o the"Fill Up" position. He will then "inch" the fill up to the requested valve by introducing successive small increments of the fuel into the tank of the automotive vehicle by repeated rapid operations of the lever 70 of the dispensing nozzle. It does not constitute a departure from the broader aspects of the invention to provide a metering and cutoff device which will operate accurately to cut off the flow of fuel at the point where the desired fill has been achieved.

Where a customer demands a specified quantity of the fuel or such a quantity as may be purchased for a named sum of money, he will ordinarily insist upon extreme accuracy of fill. Consequently, it is preferred to cause the metering and cutoff device to interrupt the flow of fuel a relatively small fraction of a gallon ahead of the completion of the fill. The inching operation can then be carried on by the operator with reference either to the gallonage counter or to the cost indicating means with which most dispensing pedestals are equipped.

Where the metering and cutoff device described herein is employed with an automatic dispensing nozzle, it will be evident that if the customer has miscalculated to the extent that his tank will not accept the designated quantity of fuel, the automatic nozzle will shut off the fuel flow independently when the tank is full.

Modifications may be made in the invention without departing from the spirit of it. The invention having been described in an exemplary embodiment, what is claimed as new and desired to be securely by Letters Patent is:

We claim:

1. A metering and cutoff device for fluids comprising a casing, a passageway for fluid through said casing, an hydraulic motor within said casing adapted to be driven by the passage of fluid therethrough in proportion to the flow of said fluid, speed reduction means connecting said motor with a gear on a shaft which extends through a portion of said casing, a knob and pointer located on said shaft externally of said casing, a cam on said shaft within said casing, a valve in said passageway adapted in one position to shut off the flow of fluid through said casing, a cam follower having an actuating connection with said valve, said cam having a notch to permit said cam follower to move to a position in which said valve will be closed when said pointer reaches a predetermined position, and means for rendering the metering and cutoff device indefinitely inactive when said pointer occupies another position, said means comprising an interruption in the teeth of the said gear such that when the pointer occupies the last mentioned position, said gear will be out of driven connection with said speed reducing means, and said cam follower will lie against a portion of said cam whereby it will be maintained in the valve open-position.

2. The structure claimed in claim 1 including means for locking the said gear in the last mentioned position.

3. The structure claimed in claim 2 comprising a means for bringing the said gear out of mesh with said speed reducing means, said last mentioned means comprising a sliding but non-rotative connection between said shaft and said cam, said gear being affixed to said shaft, said shaft being depressible to effect the aforesaid disconnection, and a compression spring engaged between said cam and said gear whereby to return said gear to a level such that it can mesh with said speed reducing means.

4. The structure claimed in claim 3 wherein the notch in the said cam is so configured as to make it difficult to rotate said shaft until the pointer lies in a position other than the said inactive position unless the fluid pressures on both sides of said valve are substantially equal.

5. The structure claimed in claim 4 wherein the said valve is a double-poppeted valve.

6. In combination, a fluid dispensing nozzle containing a valve, a handle for operating the said valve, means for latching the said handle in the valve-open position, and a metering and cutoff device also containing a valve, a hydraulic motor, a speed reducing means, a cam driven by said hydraulic motor through said speed reducing means, and means for operating the last mentioned valve comprising a cam follower in contact with said cam, said cam having a notch adapted to permit closure of said valve upon the attainment of a predetermined flow of fluid through said metering and cutoff device, said cam being manually rotatable to a position in which said last mentioned valve will be open, the said notch having a substantially radial side and a second side having a first relatively steep slope and a second relatively gentle slope so as to inhibit opening of the said valve if a substantial differential of pressure exists on opposite sides of it, whereby when the valve in said metering and cutoff device is closed, it will be found difficult to open it until the valve in said dispensing nozzle is closed.

7. The structure claimed in claim 6 wherein the said fluid dispensing nozzle is an automatic nozzle having sensing means for closing the valve therein.

8. The structure claimd in claim 6 wherein the valve in said metering and cutoff device is a double poppeted valve having a main valve portion and a supplementary valve portion, the said supplementary valve portion being of restricted character but openable under less force than is required to open the main valve portion, whereby upon the application of force to said cam said supplementary valve portion will open sufficiently to equalize the pressure on opposite sides of the said valve as a whole, providing the valve in said fluid dispensing nozzle is in closed position.

9. The structure claimed in claim 8 wherein said fluid dispensing nozzle has automatically acting means to close the valve therein, said last mentioned means having sensing means for closing said valve when material being dispensed reaches an external portion of the end of said nozzle.

10. A metering and cutoff device comprising a body, an externally threaded connection at one end of said body and an internally threaded connection at the other end thereof, there being in said body a passageway between said connections, said passageway having a first enlargement to contain an hydraulic motor and a second enlargement to contain a check valve, a platform mounted in said body to close one side of said passageway, an hydraulic motor in the first of said enlargements having a shaft passing through said platform, a valve in the second of said enlargements pivoted to a shaft extending through said platform, said body having a cover, a shaft bearing a knob and pointer rotatably and slidably mounted in said cover, a first gear fixedly mounted on said shaft, a second gear on the shaft of said hydraulic motor above the said platform, speed reducing means above the said platform having portions meshing with said first and second mentioned gears, a cam element rotatably mounted on said platform but fixed against axial movement, there being a sliding but non-rotating connection between the shaft which extends through said cover and the said cam, a third gear mounted above the said platform on the shaft of said valve, a lever mounted on the said platform at one end and bearing a toothed segment meshing with said third gear, said lever having at its other end a cam follower for contacting the surface of said cam, a compression spring located between said first gear and said cam whereby said first gear and the cam may be rotated independently of said speed reducing means upon depression of said shaft and subsequent axial movement of said first gear, means for biasing said cam follower against the surface of said cam, the surface of said cam having a notch to cause the said cam follower to close the said valve, the said first gear having a portion devoid of teeth whereby said first gear can be disconnected from the speed reducing means in one rotative position thereof and irrespective of the axial position of said shaft which passes through the said cover.

11. The structure claimed in claim 10 including a dial non-rotatably mounted on said cover and coacting with said pointer, and means on said dial for indicating a position of said shaft which passes through the cover such that the driving connection between said speed reducing means and said first gear is inoperative.

12. The structure claimed in claim 11 wherein the said notch having a substantially radial side and a second side having a first relatively steep slope and a second relatively gentle slope, so as to make it difficult to open the said valve when there is a substantial difference in fluid pressure on opposite sides thereof.

References Cited by the Examiner

UNITED STATES PATENTS

| 1,857,627 | 5/32 | Elder | 222—20 |
| 2,224,540 | 12/40 | Fraser | 222—17 |
| 2,589,650 | 3/52 | Wolcott | 222—20 |

FOREIGN PATENTS 636,188  2/62  Canada.

LOUIS J. DEMBO, *Primary Examiner.*

ERNEST A. FALLER, Jr., *Examiner.*